W. S. WILLIAMS.
STEERING DEVICE FOR TRACTION ENGINES.
APPLICATION FILED MAY 31, 1912.
1,076,340.
Patented Oct. 21, 1913.
2 SHEETS—SHEET 1.
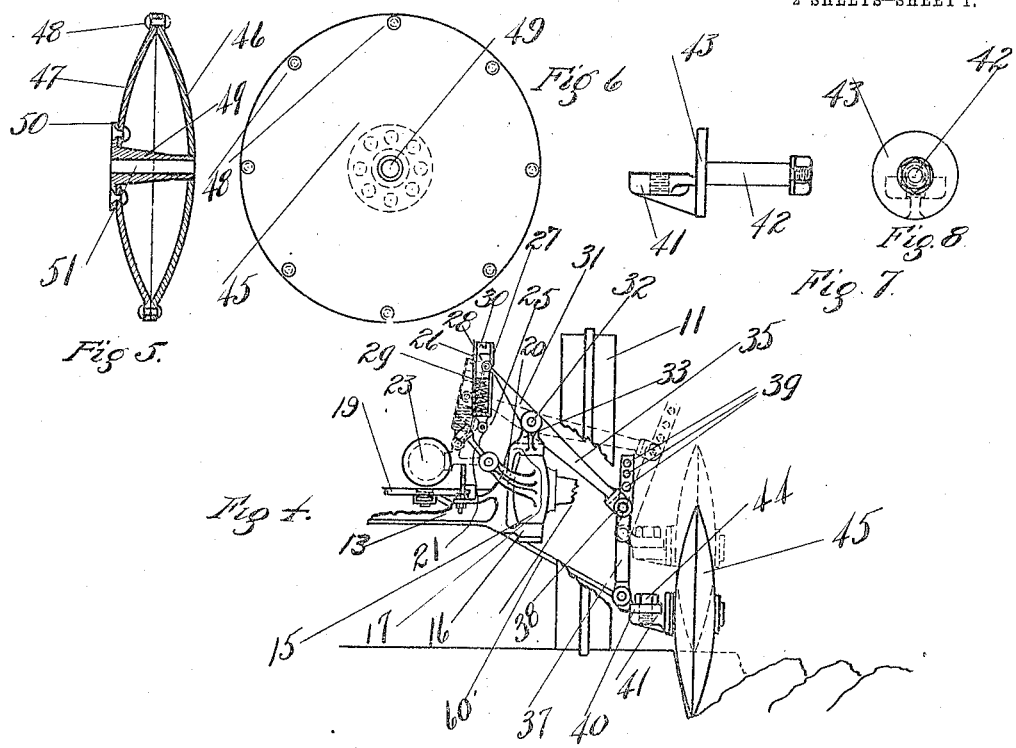
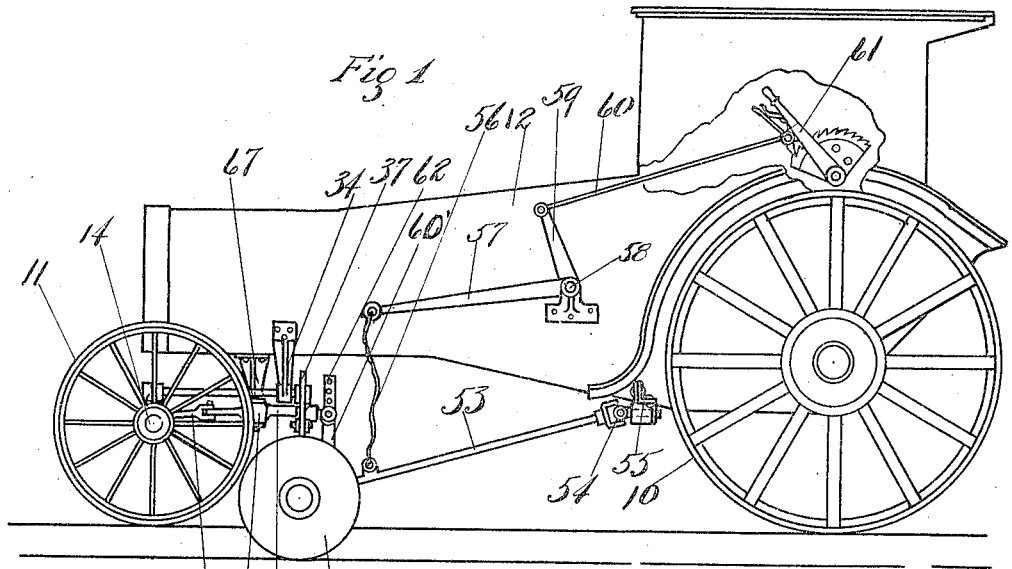
Witnesses
H. A. Bowman
H. A. Crew
Inventor
Wilbur S. Williams.
By F. A. Whiteley
Attorney

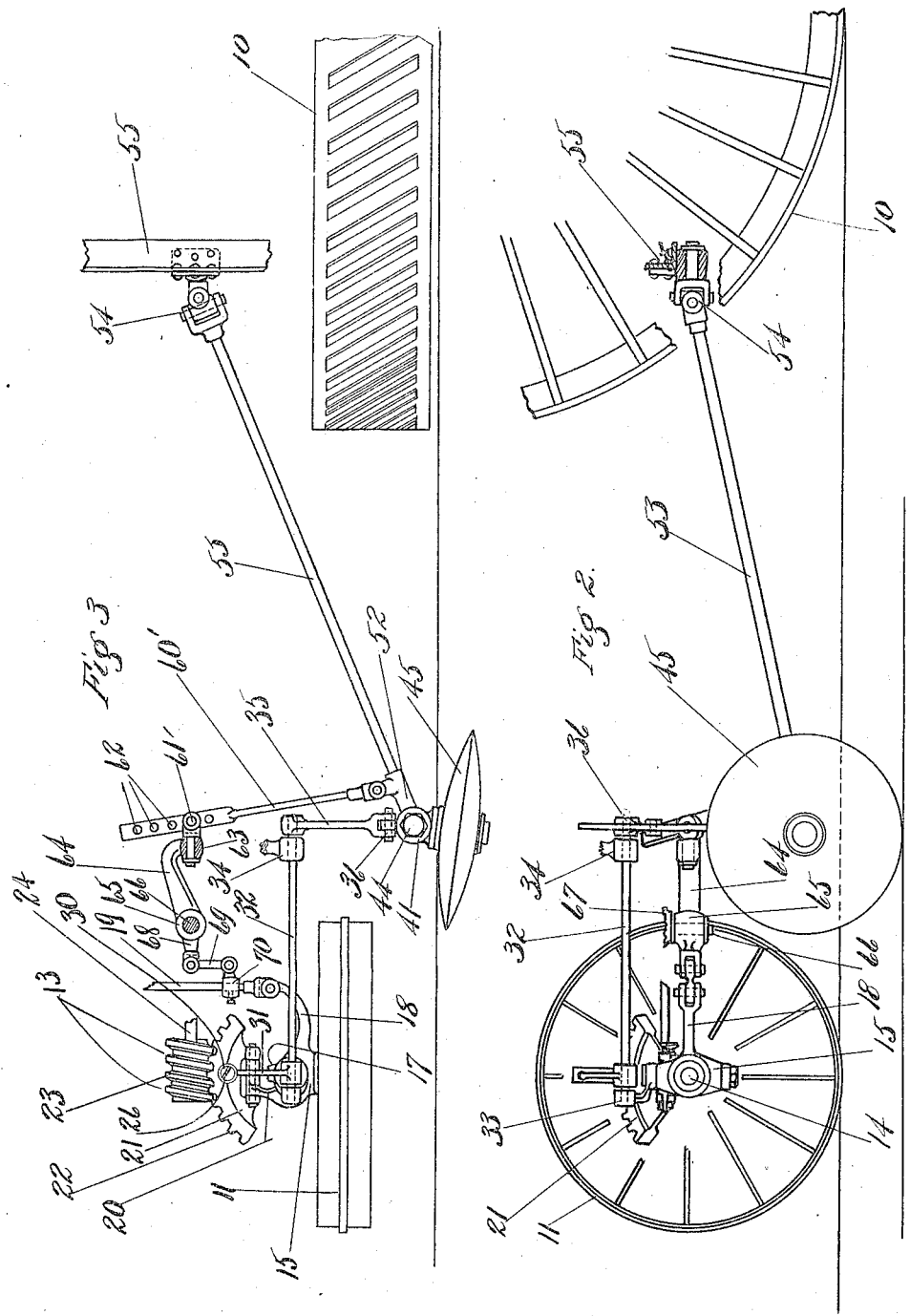

UNITED STATES PATENT OFFICE.

WILBUR S. WILLIAMS, OF MINNEAPOLIS, MINNESOTA.

STEERING DEVICE FOR TRACTION-ENGINES.

1,076,340.

Specification of Letters Patent.     Patented Oct. 21, 1913.

Application filed May 31, 1912. Serial No. 700,612.

*To all whom it may concern:*

Be it known that I, WILBUR S. WILLIAMS, a citizen of the United States, residing at Minneapolis, in the county of Hennepin and State of Minnesota, have invented certain new and useful Improvements in Steering Devices for Traction-Engines, of which the following is a specification.

My invention relates to steering devices for traction engines when used for plowing.

It is a principal object of my invention to provide a steering device for the above purpose which shall include a pilot wheel adapted to run in a furrow and bear against the side thereof, said wheel being connected to the traction engine so as to be positioned between the rear traction wheels and the front steering wheels although held outside of the vertical plane of said wheels.

It is a further object of my invention to provide means whereby when the pilot wheel is operating in the furrow the steering wheels of the engine will be disconnected from the usual manually controlled steering mechanism and be controlled solely by the pilot wheel, this means being such that when the wheel for any reason is caused to rise from the furrow the said manually controlled steering mechanism is automatically caused again to resume control of the steering wheels of the engine.

A further object of my invention is to provide a furrow pilot wheel of a novel form which may be readily constructed from sheet metal.

The full objects and advantages of my invention will appear in connection with the detailed description thereof and are particularly pointed out in the claims.

In the drawings, illustrating the application of my invention in one form,—Figure 1 is a side elevation of a traction engine indicated somewhat diagrammatically with my novel steering mechanism attached thereto. Fig. 2 is a fragmentary view on a larger scale with some parts broken away similar to Fig. 1. Fig. 3 is a plan view of the parts shown in Fig. 2. Fig. 4 is a front elevation of my steering device with some parts broken away. Figs. 5 and 6 are detail views of one form of my improved furrow wheel. Figs. 7 and 8 are detail views of the supporting means for said wheel.

The traction wheels 10, front steering wheels 11, and body 12 of the traction engine shown are or may be of any well known construction. The front axle 13 of the engine, however, is of the divided or automobile type, each of said wheels 11 being mounted on a stub axle 14 extending outwardly from a hub 15 vertically pivoted between bracket arms 16 and 17 on the ends of axle 13, the said hubs being provided with horizontally disposed arms 18 connected by a link 19 to cause the arms and wheels 11 to be oscillated in unison on the vertical hubs 15. A bracket 20 extends outwardly from hub 15 so as to avoid the bracket 17, as best shown in Fig. 3. Pivoted to move horizontally on the end of bracket 20 is a segment arm 21 having on the periphery thereof a series of teeth 22 adapted to mesh with a worm 23 on the end of a rod 24 connected with usual normally controlled steering mechanism. Pivoted at 25 to the segment arm 21 is an arm 26 which is in the form of a tube with an open slot 27 up one side thereof. A block 28 is slidably mounted in said tube and normally pressed upward by means of the spring 29 against a plug 30 closing the end of said tubular arm 26. The block 28 is pivoted to an arm 31 fast on a rock shaft 32 journaled in an extension 33 of bracket 17 and a hanger 34 extending down from the frame of the engine. Secured to the inner end of rock shaft 32 is another arm 35 having on the end thereof a yoke 36. A bar 37 is pivotally secured in said yoke by means of a bolt 38 passing through one of a number of apertures 39 formed in said bar for providing a means of adjustment. The bar 37 has a piece 40 pivoted thereto to swing in a vertical plane and to said piece 40 is rigidly bolted the flange 41 of a wheel spindle 42, said spindle being formed with a disk 43 adjacent the flange 41. The bolt 44 by which the flange 41 is secured to piece 40 is relatively large and is designed to hold the spindle 42 in any desired position of angular adjustment relative to piece 40.

The furrow wheel 45 is journaled on spindle 42. This furrow wheel is preferably formed of two pieces of sheet metal 46 and 47 secured together by rivets 48 at the peripheries thereof to form a central flange, each of plates 46 and 47 being bulged so that the wheel is lens-shaped in cross section, as shown in Fig. 5. Each of plates 46 and 47 has a central aperture punched through the same, that punched through plate 47 being preferably larger than that punched in plate 46, and within these apertures is seated a hub 49 having a flange 50 on the inner side thereof by which said hub is riveted to plate 47, the hub being formed with a bearing 51 for receiving the spindle 42. As best shown in Fig. 3, the piece 40 is provided with an extension 52 receiving the end of a rod 53 connected by means of a universal joint 54 with a frame member 55 of the engine. The wheel 45 therefor is suspended by means of the link or bar 37 and the rod 53 and may rise and fall relatively to the surface of the ground by swinging the arm 35 and the rock shaft 32, it being noted that when the wheel rises and said rock shaft is rocked the member 28 through arm 31 is moved downwardly against the force of spring 29 finally operating to swing segment arm 21 so that the teeth thereof mesh with the worm 23, as indicated in dotted lines in Fig. 4. When the wheel drops into the furrow, therefore, the segment 21 will be withdrawn from engagement with the worm and when the wheel is lifted to a determined amount, in practice about the level of the ground, the segment gears the worm to the arm 20 so that the wheels become subject to the manually controlled steering mechanism of the engine.

For lifting the furrow wheel 45 from the ground a flexible connection 56 extends to one arm 57 of an elbow lever pivoted at 58, the other arm 59 of which is connected by a link 60 with a hand lever 61 in the cab of the engine by means of which the wheel 45 may be held inoperative and the segment 21 be held in engagement with the worm 23 whenever the engine is not being used for plowing. It will be noted that the suspension of the pilot wheel 45 from the link or bar 37 and the seating rod 53 is such as to permit ready oscillating movement in a direction transverse to the direction of movement of the machine so that the furrow wheel may follow any irregularities of the furrow wall. The steering wheels of the engine are controlled by such a movement through a link 60' pivotally connected with the extension 52 and connected, by means of a bolt 61' through one of several apertures 62 adjacent the free end of said link, with a swivel bolt 63 having a bearing in an arm 64 of the hub 65 of which is mounted to oscillate in a horizontal plane upon a pin 66 depending from a hanger 67 secured to the frame of the engine. An arm 68 extends from hub 65 into proximity with the link 19 connecting the arms 18 on the steering wheel hubs 15 and the arm 68 is pivotally connected by means of a link 69 with a piece 70 adjustably secured to link 19. It fol-lows, therefore, that as the furrow wheel 45 may be oscillated transversely to the engine it will, through link 60', arm 64, arm 68 and link 69, oscillate the link 19 and with it the arms 18 and steering wheels 11 of the traction engine, and this oscillation will always be in a direction to turn the steering wheels so as to cause them to move toward or away from the line of the plowing according as the pilot wheel is moved.

As already pointed out, the pilot wheel is designed to be set with a slant toward the side wall of the furrow, the bulging part of the wheel engaging said side wall which constrains the wheel to follow along the furrow. That is, the wheel is always running in toward the furrow wall and engagement of the side of the wheel with the furrow wall prevents it from running out so that the pilot wheel will follow along the wall of the furrow moving in and out according as the furrow wall may curve in or out. A movement of the wheel in toward the plowed land or away from the traction engine will, through the combination of levers described, oscillate the steering wheels 11 so as to turn them toward the furrow and when the pilot wheel moves in the opposite direction the steering wheels 11 will be correspondingly oscillated away from the furrow. These compensating movements will necessarily be small, the result of which would be to cause the steering wheels of the engine to track along almost if not quite exactly parallel with the direction of the furrow wall. During all of this time when the pilot wheel 45 is in the furrow the hand-operative steering mechanism is disconnected from any control of the steering wheels of the traction engine which are controlled solely by the pilot wheel 45. If at any time the furrow runs out or becomes filled so that the wheel 45 rises to the top of the ground or if the wheel 45 is raised by the operator the segment 21 will be forced down by the means already described so as to cause the teeth 22 thereof to mesh in the worm 23 with the result that the steering wheels 11 will be locked in fixed position but under control of the operator through the hand-operative steering mechanism.

My invention is simple in structure, can conveniently be applied to any type of traction engine, is easy to operate and keep in order, and is absolutely accurate in its results.

I claim:

1. In combination with a traction engine provided with front steering wheels mounted on short stub axles connected to oscillate about vertical pivots in unison, a rod connected by universal joint with a rear frame member and extending obliquely to the side of the engine between the wheels thereof, a link pivoted to swing transversely of the engine to the lower end of which said rod is pivotally connected, a furrow pilot wheel journaled at the end of said rod, and means connecting said furrow pilot wheel with the steering wheels whereby lateral movements of the pilot wheel will effect corresponding oscillation of the steering wheels.

2. In combination with a traction engine provided with front steering wheels mounted on short stub axles connected to oscillate about vertical pivots in unison, a rod connected by universal joint with a rear frame member and extending obliquely to the side of the engine between the wheels thereof, a link pivoted to swing transversely of the engine to the lower end of which said rod is pivotally connected, a furrow pilot wheel journaled at the end of said rod and having a fixed angular position relative to the direction of travel of the engine, and means connecting said furrow pilot wheel with the steering wheels whereby lateral movements of the pilot wheel will effect corresponding oscillation of the steering wheels.

3. In combination with a traction engine provided with front steering wheels mounted on short stub axles connected to oscillate about vertical pivots in unison, a rod connected by universal joint with a rear frame member and extending obliquely to the side of the engine between the wheels thereof, a link pivoted to swing transversely of the engine to the lower end of which said rod is pivotally connected, a furrow pilot wheel journaled at the end of said rod and adapted to run in a furrow or along the surface of the ground, and means connecting said furrow pilot wheel with the steering wheels whereby lateral movements of the pilot wheel will effect corresponding oscillation of the steering wheels.

4. In combination with a traction engine provided with front steering wheels mounted on short stub axles connected to oscillate about vertical pivots in unison, a rod connected by universal joint with a rear frame member and extending obliquely to the side of the engine between the wheels thereof, a link pivoted to swing transversely of the engine to the lower end of which said rod is pivotally connected, a furrow pilot wheel journaled at the end of said rod and adapted to run in a furrow or along the surface of the ground, means connecting said furrow pilot wheel with the steering wheels whereby lateral movements of the pilot wheel will effect corresponding oscillations of the steering wheels, and means for swinging said rod and link to hold the furrow wheel out of contact with the ground.

5. In combination with a traction engine having steering wheels mounted on stub axles adapted to oscillate about vertical pivots and having arms extending outwardly from said axles and connected by a transverse link, a rod having universal joint connection with a rear frame member of the engine and extending obliquely to the side of the engine between the wheels thereof, a link pivoted to swing transversely of the engine to the lower end of which said rod is pivotally connected, a furrow pilot wheel journaled at the end of said rod and adapted to run in a furrow or along the surface of the ground, a two-armed lever pivoted to swing horizontally and having one arm pivotally connected with said first named link, and a link pivotally connecting the other arm of said lever with the lower end of said rod whereby lateral swinging movements of the pilot wheel will cause corresponding oscillations of the steering wheels.

6. A traction engine comprising oscillatable steering wheels, hand operative means for oscillating said wheels, a furrow pilot wheel having connections for oscillating said wheels, and means for disconnecting the hand operative means from the steering wheels when the pilot wheel descends into a furrow.

7. A traction engine comprising oscillatable steering wheels, hand operative means for oscillating said wheels, a furrow pilot wheel having connections for oscillating said wheels, and means dependent upon the position of the pilot wheel relative to the surface of the ground for connecting and disconnecting said hand operative means from the steering wheels.

8. A traction engine comprising oscillatable steering wheels, hand operative means for oscillating said wheels including a worm, a furrow pilot wheel having connections for oscillating said wheels through lateral movements thereof, a pivoted arm provided with a gear segment adapted to mesh with said worm in one position, and means connecting said pilot wheel with the pivoted arm whereby vertical movements of the pilot wheel will bring said segment into and out of mesh with the worm.

9. A traction engine comprising oscillatable steering wheels, hand operative means for oscillating said wheels including a worm, a furrow pilot wheel having connections for oscillating said wheels through lateral movements thereof, a pivoted arm provided with a gear segment adapted to mesh with said worm in one position, a two-armed lever, one arm of which is pivotally connected with said segment arm, and a link pivoted to the other arm of said lever and supporting said pilot wheel.

10. A traction engine comprising oscillatable steering wheels, hand operative means for oscillating said wheels including a worm, a furrow pilot wheel having connections for oscillating said wheels through lateral movements thereof, a pivoted arm provided with a gear segment adapted to mesh with said worm in one position, a two-armed lever, one arm of which is pivotally connected with said segment arm, and a link pivoted to the other arm of said lever and supporting said pilot wheel, the connection from the segment arm to the arm of the lever including a give-and-take spring.

In testimony whereof I affix my signature in presence of two witnesses.

WILBUR S. WILLIAMS.

Witnesses:
 JESSE VAN VALKENBURG,
 F. A. WHITELEY.